United States Patent
Hu et al.

(10) Patent No.: US 7,627,614 B2
(45) Date of Patent: Dec. 1, 2009

(54) LOST WRITE DETECTION AND REPAIR

(75) Inventors: Wei Ming Hu, Palo Alto, CA (US); Mark Dilman, San Mateo, CA (US); J. William Lee, Redwood Shores, CA (US); Juan R. Loaiza, Redwood City, CA (US); Vinay Srihari, South San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 11/072,111

(22) Filed: Mar. 3, 2005

(65) Prior Publication Data

US 2006/0200497 A1    Sep. 7, 2006

(51) Int. Cl.
G06F 17/30 (2006.01)

(52) U.S. Cl. ..................................... 707/203

(58) Field of Classification Search ................ None
See application file for complete search history.

(56) References Cited

U.S. PATENT DOCUMENTS

| | | | |
|---|---|---|---|
| 4,507,751 A * | 3/1985 | Gawlick et al. | 707/202 |
| 4,710,926 A * | 12/1987 | Brown et al. | 714/4 |
| 4,945,474 A * | 7/1990 | Elliott et al. | 714/16 |
| 5,146,571 A | 9/1992 | Logan | |
| 5,182,752 A | 1/1993 | DeRoo et al. | |
| 5,233,618 A | 8/1993 | Glider et al. | |
| 5,327,556 A * | 7/1994 | Mohan et al. | 707/8 |
| 5,329,628 A * | 7/1994 | Yamamoto et al. | 707/8 |
| 5,418,940 A * | 5/1995 | Mohan | 714/5 |
| 5,581,754 A * | 12/1996 | Terry et al. | 707/8 |
| 5,588,012 A | 12/1996 | Oizumi | |

(Continued)

FOREIGN PATENT DOCUMENTS

EP    0 503 417 A2    9/1992

(Continued)

OTHER PUBLICATIONS

Written Opinion from PCT for foreign patent application No. PCT/US03/09063, dated May 24, 2004 (11 pgs.)—attached.

(Continued)

*Primary Examiner*—Neveen Abel Jalil
*Assistant Examiner*—Mark Andrew X Radtke
(74) *Attorney, Agent, or Firm*—Hickman Palermo Truong & Becker LLP

(57) ABSTRACT

Techniques are provided for detecting lost writes so that data corruption can be avoided. According to one technique, lost writes are detected by comparing version numbers that are indicated in redo log entries with version numbers that are indicated in corresponding blocks in a standby database. According to one technique, which may be used in conjunction with the above technique, lost writes are detected by logging read operations that occur relative to a primary database, and comparing version numbers that are indicated in read log entries with version numbers that are indicated in corresponding blocks in a standby database. According to one technique, lost writes are detected by comparing, in response to read operations, (a) version numbers that are stored in a persistent in-memory cache with (b) version numbers that are indicated in corresponding blocks that are read from a primary database.

16 Claims, 5 Drawing Sheets

U.S. PATENT DOCUMENTS

| | | | |
|---|---|---|---|
| 5,696,775 A | | 12/1997 | Nemazie et al. |
| 5,717,893 A | * | 2/1998 | Mattson ............. 711/129 |
| 5,734,898 A | * | 3/1998 | He ..................... 707/203 |
| 5,805,799 A | | 9/1998 | Fredrickson et al. |
| 5,870,763 A | * | 2/1999 | Lomet ................. 707/202 |
| 5,893,930 A | | 4/1999 | Song |
| 5,960,436 A | * | 9/1999 | Chang et al. ......... 707/101 |
| 6,009,542 A | | 12/1999 | Koller et al. |
| 6,067,550 A | * | 5/2000 | Lomet ................. 707/202 |
| 6,094,708 A | | 7/2000 | Hilla et al. |
| 6,098,190 A | | 8/2000 | Rust et al. |
| 6,151,607 A | * | 11/2000 | Lomet ................. 707/202 |
| 6,272,500 B1 | * | 8/2001 | Sugita ................. 707/103 R |
| 6,298,425 B1 | * | 10/2001 | Whitaker et al. ..... 711/162 |
| 6,324,661 B1 | | 11/2001 | Gerbault et al. |
| 6,438,724 B1 | | 8/2002 | Cox et al. |
| 6,446,234 B1 | | 9/2002 | Cox et al. |
| 6,449,623 B1 | * | 9/2002 | Bohannon et al. ..... 707/202 |
| 6,535,869 B1 | * | 3/2003 | Housel, III ........... 707/2 |
| 6,560,743 B2 | | 5/2003 | Plants |
| 6,728,879 B1 | * | 4/2004 | Atkinson .............. 713/168 |
| 6,732,125 B1 | * | 5/2004 | Autrey et al. ......... 707/204 |
| 7,149,858 B1 | * | 12/2006 | Kiselev ................ 711/162 |
| 7,246,275 B2 | * | 7/2007 | Therrien et al. ....... 714/710 |
| 7,257,689 B1 | * | 8/2007 | Baird ................... 711/162 |
| 2002/0049950 A1 | | 4/2002 | Loaiza et al. |
| 2002/0091718 A1 | * | 7/2002 | Bohannon et al. ..... 707/202 |
| 2003/0061537 A1 | * | 3/2003 | Cha et al. ............. 714/16 |
| 2003/0140288 A1 | | 7/2003 | Loaiza et al. |
| 2006/0242513 A1 | | 10/2006 | Loaiza et al. |

FOREIGN PATENT DOCUMENTS

| | | |
|---|---|---|
| JP | 59-081940 | 5/1984 |
| JP | 02-189663 | 7/1990 |
| JP | 08-235032 | 9/1996 |
| JP | 10-040122 | 2/1998 |
| JP | 10-240575 | 9/1998 |

OTHER PUBLICATIONS

Current Claims in PCT patent application No. PCT/US03/09063 (10 pgs.)—attached.

Antoni Cau, et al., "Specifying Fault Tolerance within Stark's Formalism," 1993, IEEE, pp. 392-401.

IBM Corp., "IBM OS/2 Extended Edition Configuration," Feb. 1990, IBM Technical Disclosure Bulletin, vol. 32, No. 9B, pp. 446-451.

International Searching Authority, "Notification of Transmittal of the International Search Report or the Declaration," Jun. 10, 2004, 9 pages.

Current claims in PCT patent application, International Application No. PCT/US01/49760, 13 pages.

Japanese Patent Office, "Notice of Grounds of Rejection", Patent Application No. 558135-2002, received Apr. 4, 2008, 2 pages.

Claims, Patent Application No. 558135-2002, 9 pages.

Canadian Intellectual Property Office, Office Action, foreign application No. 2,482,891, received May 16, 2008, 8 pages.

Claims, foreign application No. 2,482,891, 6 pages.

Japanese Patent Office, "Office Action", Foreign application No. PCT/US03/09063, dated Aug. 4, 2008, 12 pages.

Claims, Foreign application No. PCT/US03/09063, 11 pages.

India Patent Office, "Office Action", foreign application No. 1574/KOLNP/04, received Sep. 2, 2008, 1 page.

Claims, foreign application No. 1574/K0LNP/04, 12 pages.

* cited by examiner

LOST WRITE DETECTION AND REPAIR

RELATED APPLICATIONS

This application is related to U.S. patent application Ser. No. 09/765,680, entitled "DATA INTEGRITY VERIFICATION MECHANISM", filed on Jan. 18, 2001 by Juan R. Loaiza, Wei Ming Hu, and J. William Lee, the entire contents of which are incorporated by reference for all purposes in their entirety as though fully disclosed herein.

This application is related to U.S. patent application Ser. No. 10/133,002, entitled "ENHANCEMENTS TO DATA INTEGRITY VERIFICATION MECHANISM", filed on Apr. 25, 2002 by Juan R. Loaiza, Wei Ming Hu, and J. William Lee, the entire contents of which are incorporated by reference for all purposes in their entirety as though fully disclosed herein.

FIELD OF THE INVENTION

The present invention relates generally to data integrity in computer applications, and more specifically, to detecting and repairing lost writes.

BACKGROUND OF THE INVENTION

Society has become extremely dependent upon computers. In today's world, computers are used for everything from financial planning, to company payroll systems, to aircraft guidance systems. Because of the wide spread use of computers systems, data corruption is a problem that can affect almost any individual and an issue that continues to plague both the computer hardware and computer software industries.

For example, software applications, such as database applications, are extremely dependent upon maintaining the integrity of their data. If the data associated with a database application is corrupted, users may experience incorrect results and possibly system crashes.

Data corruption may result from a variety of reasons and from a variety of different sources. For example, a software "bug" in a database application may itself cause invalid data, such as a negative social security number or invalid pointer address, to be stored in a table or data structure. In addition, other programs executing on the same computer system, including the operating system itself, may inadvertently overwrite certain variables, tables, data structures, or other similar types of information, thus corrupting the data that is associated with a particular software application. Still further, when an application writes a block of data to a storage medium, the data typically travels through many intermediate layers of software and hardware before it is actually stored to the storage medium. Hence, there is even a further potential for the data block to become corrupted prior to, or at the time it is being written to the storage medium.

For example, when writing a data block to disk, the data may travel from the software application to a volume manager, from the volume manager to a device driver, from the device driver to a storage device controller, and from the storage device controller to a disk array before being stored onto disk. When the data block is later read from the disk, the data must again travel through the same set of software and hardware layers before it can be used by the software application. Thus, a bug at any of these layers may potentially corrupt the data. Additionally, if the disk is unstable, thus causing errors to be introduced into the data after it is written to disk, the integrity of the data may be compromised even if the other layers do not erroneously alter the data.

When an I/O subsystem reports that a write operation has been completed even though the I/O subsystem has actually failed to write data to an I/O device, a "lost write" has occurred. A lost write may occur even if the I/O subsystem eventually succeeds in writing data to the I/O device, if the actual writing is delayed long enough for an application to read data before the actual writing occurs.

Lost writes may lead to data corruption. Since the write operation does not actually occur (or occurs too late), applications may obtain stale, incorrect data when they later read, from the I/O device, data that should have been overwritten and updated but wasn't. If the applications then use that data to generate or determine additional data, that additional data might also be incorrect. Should the applications then write the incorrect additional data to the I/O device, they unwittingly propagate the corruption. In this manner, data corruption spreads over the I/O device like a disease, compounding over time, causing all kinds of errors.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Techniques are provided for detecting lost writes. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Techniques are provided for detecting lost writes so that data corruption can be avoided. Although techniques described herein are described relative to databases, techniques described herein are also applicable to data storage subsystems of other kinds, such as file systems, storage arrays, disk arrays, volume managers, etc. Likewise, a standby database can equivalently be a mirrored storage, distributed file system, or a similar type of replicated storage. The redo log can similarly be a record of changes that are sent from the primary to the replica.

According to one technique, lost writes are detected by comparing version numbers that are indicated in redo log entries with version numbers that are indicated in corresponding blocks in a standby database.

According to one technique, which may be used in conjunction with the above technique, lost writes are detected by logging read operations that occur relative to a primary database, and comparing version numbers that are indicated in read log entries with version numbers that are indicated in corresponding blocks in a standby database.

The above "read logging" technique may be enhanced by maintaining, in memory, a cache that contains version numbers for the most recently updated blocks, and logging a read operation pertaining to a block only if the cache does not contain the version number for that block.

According to one technique, lost writes are detected by making comparisons in response to read operations. The comparisons are between (a) version numbers that are stored in a persistent in-memory cache and (b) version numbers that are indicated in corresponding blocks that are read from a primary database. Because the cache is necessarily of limited size, the version numbers for blocks that are known to not have experienced a lost write are not maintained in the cache. Before any version number is expelled from the cache according to a replacement scheme, the corresponding block is read from the primary database. The block's version number is compared to the version number about to be expelled from the cache to ensure that no lost write has occurred relative to the block.

Detecting Lost Writes Via Write Logging

Figure 1:
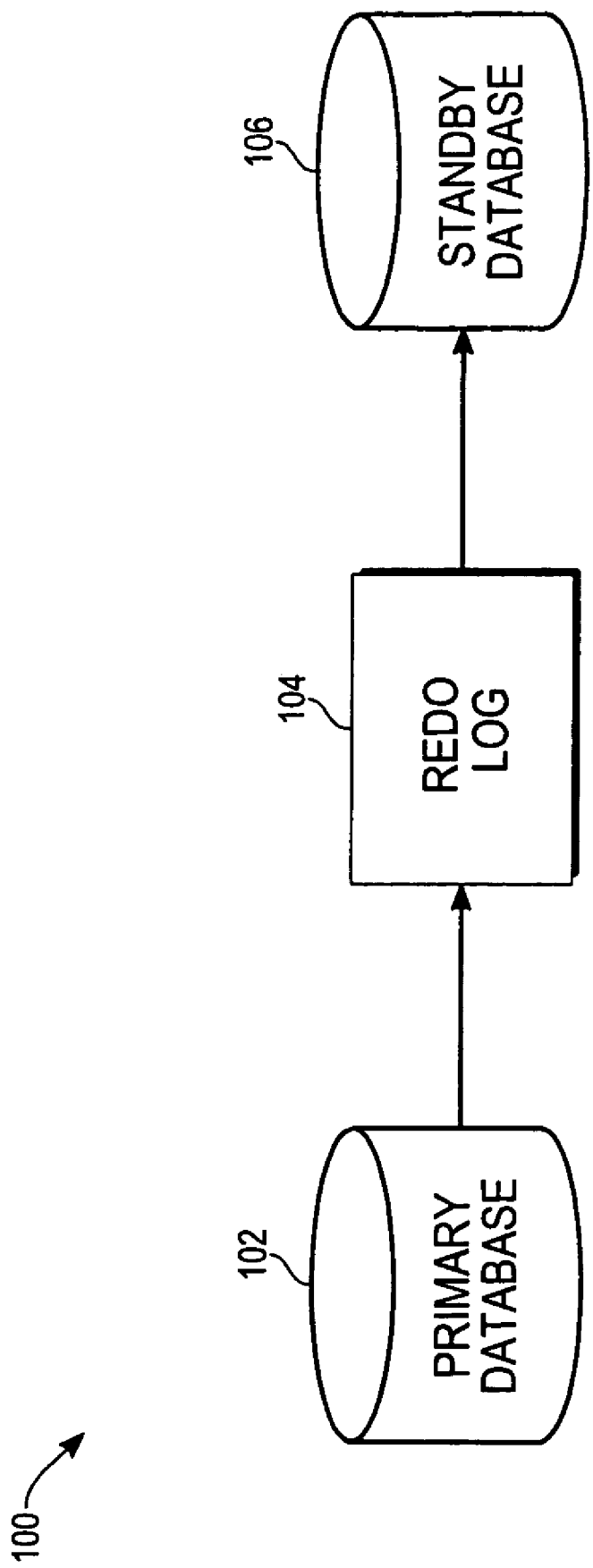
FIG. 1 illustrates a block diagram of a system in which lost writes may be detected using techniques described herein.

FIG. 1 illustrates a block diagram of a system 100 in which lost writes may be detected using techniques described herein. System 100 includes a primary database 102, a redo log 104, and a standby database 106.

As changes are made to the data in primary database 102, the changes are logged in redo log 104. In the event of a failure of primary database 102, the changes logged in redo log 104 can be repeated relative to the last known correct data in primary database 102 to ensure that the data stored in primary database 102 is up-to-date, and that none of the changes are lost.

Standby database 106 serves as a replica of primary database 102. In the event that primary database 102 becomes inaccessible or unusable, standby database 106 can be substituted for primary database 102. In this manner, applications that have been accessing the data in primary database 102 can continue to access the data without significant interruption. For further information, the reader is directed to *Oracle Data Guard Concepts and Administration*, 10 g Release 1 (10.1), which is hereby incorporated by referenced in its entirety for all purposes as though fully disclosed herein.

The data in standby database 106 is synchronized with the data in primary database 102 via the application of redo log 104 to the data in standby database 106. Because all of the changes to data in primary database 102 are indicated in redo log 104, applying the changes indicated in redo log 104 to the data in standby database 106 causes standby database 106 to replicate primary database 102.

Data in primary database 102 is stored within discrete units called "blocks." Each block contains a specified amount of data (e.g., 8 kilobytes), typically on disk. Each block indicates a unique block identifier and a current version number. Whenever the data in a particular block is modified, the block's current version number is incremented by one or more. For example, if a block's current version number is "5" prior to the modification of data stored in the block, then the block's current version number may be incremented to "6" after the block's data is modified.

For each changed block, redo log 104 indicates, in association with the block's unique block identifier, the block's previous version number and the block's current version number. As will be seen below, this information can be used in conjunction with information stored in standby database 106 to detect when a lost write has occurred.

Figure 2:
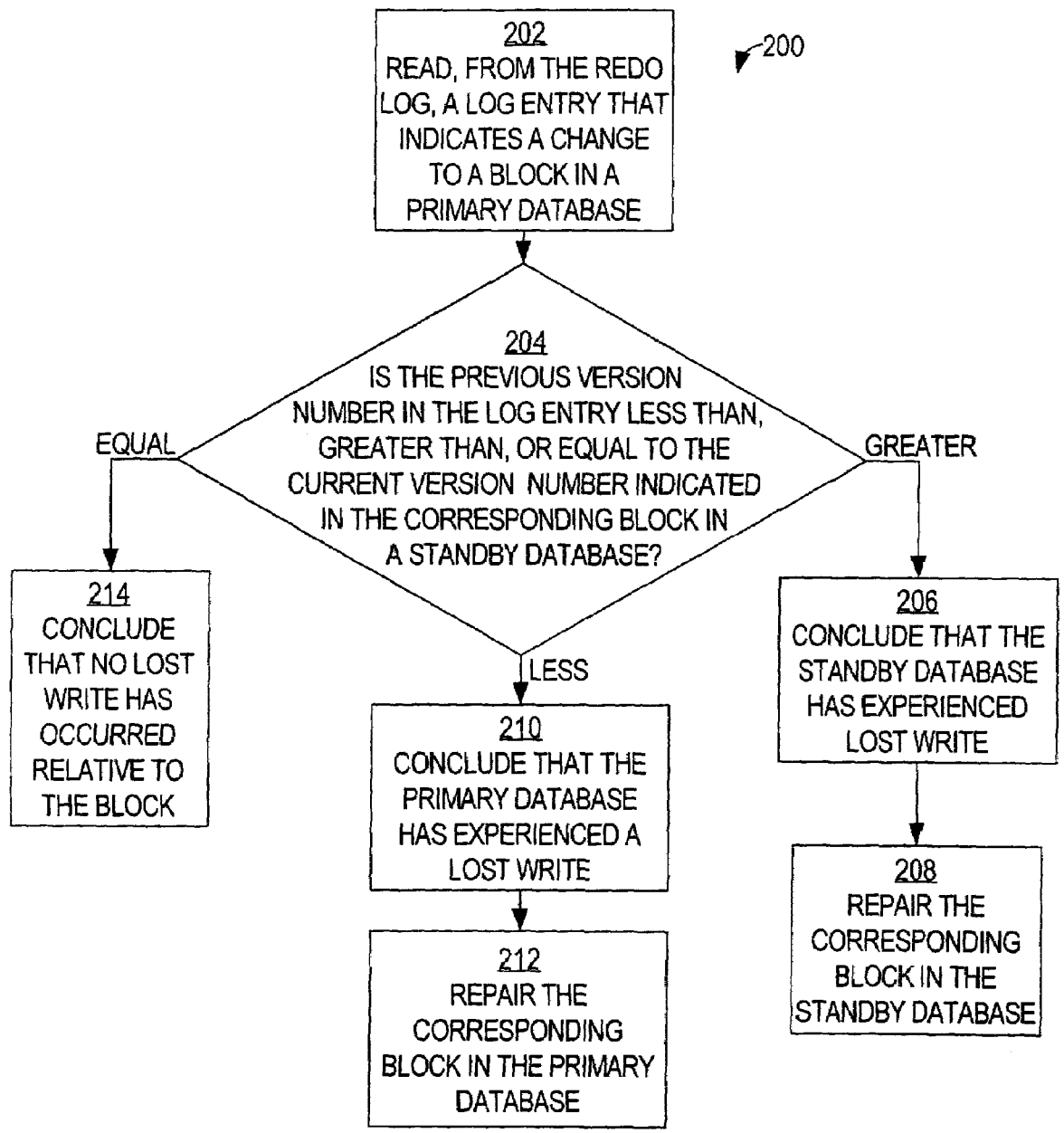
FIG. 2 is a flow diagram that illustrates an example of a technique for detecting lost writes by comparing block version numbers that are indicated in redo log entries with block version numbers that are indicated in corresponding standby database blocks.

FIG. 2 is a flow diagram that illustrates an example of a technique for detecting lost writes by comparing block version numbers that are indicated in redo log entries with block version numbers that are indicated in corresponding standby database blocks, in accordance with certain embodiments of the invention. Examples described below make reference to system 100 illustrated in FIG. 1.

In step 202, a log entry that indicates a change to a block in a primary database is read from a redo log. For example, as a part of the synchronization process with primary database 102, standby database 106 may read, from redo log 104, a log entry that indicates the details of a change that was made, in primary database 102, to a block with unique identifier "24601". The log entry indicates both the block's current version number and the block's previous version number.

In step 204, it is determined whether the previous version number indicated in the log entry is less than, equal to, or greater than the current version number indicated in the corresponding block in a standby database. For example, standby database 106 may compare the previous version number indicated in the log entry for block "24601" with the current version number indicated in block "24601" within standby database 106. If the log entry's number is greater than the standby database block's number, then control passes to step 206. If the log entry's number is less than the standby database block's number, then control passes to step 210. If the log entry's number is equal to the standby database block's number, then control passes to step 214.

In step 206, the conclusion is reached that the standby database has experienced a lost write. For example, primary database 102 may update block (at version 200) and write it out with version 201. Standby database 106 may read the same block in from its copy of the database. Applying the change to the same block at version 200 also takes it to version 201. Standby database 106 may write it out. Primary database 102 may then write the same block; at that time, the previous version is 201 and the new version is 202. This change may be written to log 104 and sent to standby database 106. Standby database 106 may read in its copy of the block to make the change. If the previous version number in log 104 (version 201) is greater than that seen by the standby database's copy, then standby database 106 must have lost a write. In this case, it's the write of block version 201. Control passes to step 208.

In step 208, an error is raised and the corresponding block in the standby database is repaired. For example, primary database 102 may send its version of block "24601" to standby database 106. The primary database's version of the block already incorporates the changes indicated in the log entry. Standby database 106 may overwrite its version of block "24601" with the version received from primary database 102. As a result, the effects of the lost write on block "24601" in standby database 106 are nullified.

Alternatively, in step 210, the conclusion is reached that the primary database has experienced a lost write. Control passes to step 212.

In step 212, the corresponding block in the primary database is repaired. For example, standby database 106 may send its version of block "24601" to primary database 102. Primary database 102 may overwrite its version of block "24601" with the version received from standby database 106. The changes indicated in the log entry may be applied to the new version of block "24601" to bring block "24601" up-to-date in primary database 102. As a result, the effects of the lost write on block "24601" in primary database 102 are nullified.

Alternatively, in step 214, the conclusion is reached that no lost write has occurred relative to the block. No apparent repairs need to be made to either primary database 102 or standby database 106.

As a result of the above technique, some data corruption due to lost writes are detected and repaired.

Detecting Lost Writes Via Read Logging

In spite of the technique described above, it may still be possible for an application to read, from primary database 102, a block that is "stale" due to a lost write, if the application reads the block before the above technique detects the lost write (i.e., before a second write to the stale block). If this occurs, the application might subsequently write, to another block in primary database 102, erroneous data that the application based on the previously read stale data. The technique described below may be employed to counteract such an occurrence.

Figure 3:
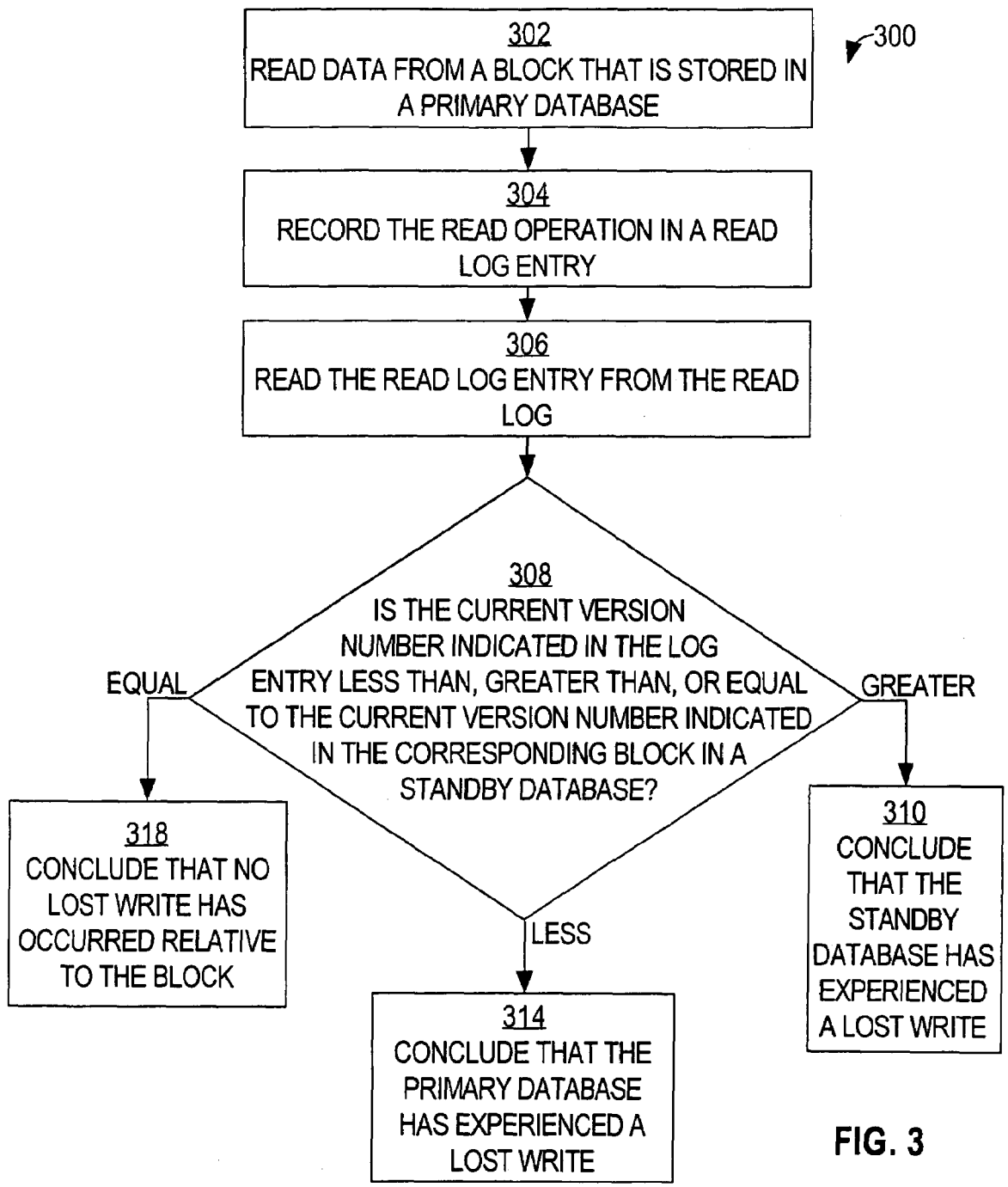
FIG. 3 is a flow diagram that illustrates an example of a technique for detecting lost writes by logging read operations that occur relative to a primary database, and comparing block version numbers that are indicated in read log entries with block version numbers that are indicated in corresponding standby database blocks.

FIG. 3 is a flow diagram that illustrates an example of a technique for detecting lost writes by logging read operations that occur relative to a primary database, and comparing block version numbers that are indicated in read log entries with block version numbers that are indicated in corresponding standby database blocks, in accordance with certain embodiments of the invention. Examples described below make reference to system 100 illustrated in FIG. 1.

In step 302, data is read from a block that is stored in a primary database. For example, an application may read, from primary database 102, data from block "24601".

In step 304, the read operation is recorded in a "read log" entry. For example, primary database 102 may append a log entry to the read log. The read log may be separate from the redo log discussed above. A read log entry may involve reads of one or more blocks. To provide a simple example for purposes of illustration, the discussion herein assumes that each log entry only describes a read operation across one block, although, in certain embodiments, each log entry may describe a read operation across more than one block. Each log entry indicates the corresponding block's unique identifier, and the current version number indicated in the blocks as stored in primary database 102.

In step 306, the read log entry is read from the read log. For example, standby database 106 may read the next unread log entry from the read log. If the primary database and the standby database are on different computers, then the read log may be shipped to the standby database.

In step 308, it is determined whether the current version number indicated in the log entry is less than, equal to, or greater than the current version number indicated in the corresponding block in a standby database. For example, standby database 106 may compare the current version number indicated in the log entry for block "24601" with the current version number indicated in block "24601" within standby database 106. If the log entry's number is greater than the standby database block's number, then control passes to step 310. If the log entry's number is less than the standby database block's number, then control passes to step 314. If the log entry's number is equal to the standby database block's number, then control passes to step 318. Basically, if the read log shows that the primary database read a lesser version (older version) that what the standby database has, then the primary database must have lost a more recent update to that block.

For example, on primary database 102, block R may be at version 2, and a write that updates it to version 4 may be lost. On standby database 106, the write is not lost, so the version there is 4. When primary database 102 reads from the block, it logs version 2. Standby database 106 checks that against its own block's version, determines that the version of the entry in the log (2) is less than the version of its corresponding block (4), and concludes that primary database 102 has experienced a lost write (of version 4).

In step 310, the conclusion is reached that the standby database has experienced a lost write. In response, the standby database may take measures to repair the affected block on the standby database and/or to quarantine the affected block on the standby database. For example, standby database 106 may flag block "24601" in standby database 106 as being invalid or unreliable, and/or perform a "rollback" operation to reverse the previous write operation that caused erroneous data to be written to block "24601" in the first place. In one embodiment, the version of block "24601" stored in primary database 102 may be used to overwrite the version of block "24601" stored in standby database 106.

Alternatively, in step 314, the conclusion is reached that the primary database has experienced a lost write. The standby database may notify the primary database about the lost write and the identity of the affected block. In response, the primary database may take measures to repair the affected block on the primary database and/or to quarantine the affected block on the primary database. In one embodiment, the version of block "24601" stored in standby database 106 may be used to overwrite the version of block "24601" stored in primary database 102. In another embodiment, the system performs a switchover such that standby database 106 becomes the primary database until (former) primary database 102 has been repaired.

When an application attempts to read, from primary database 102, a block that has been flagged as being invalid or unreliable, primary database 102 may return an error or wait until the block has been repaired. It should be noted that this applies to detecting lost writes via write logging where the primary database has experienced a lost write.

Alternatively, in step 318, the conclusion is reached that no lost write has occurred relative to the block. No apparent repairs need to be made to either primary database 102 or standby database 106.

Reducing Read Logging Via a Read Validation Cache

Traditionally, database systems have not logged read operations as described above. If all read operations were logged, then database performance might be degraded, due both to the primary database's occupation with writing to the read log and the standby database's occupation with reading from the read log. The read logging technique described above can be enhanced by maintaining, in memory, a "read validation cache" that contains version numbers for the most recently updated blocks, and logging a read operation pertaining to a block only if the read validation cache does not contain the version number for that block. As a result, fewer read operations may be logged, and database performance may be maintained at a reasonable level.

Figure 4:
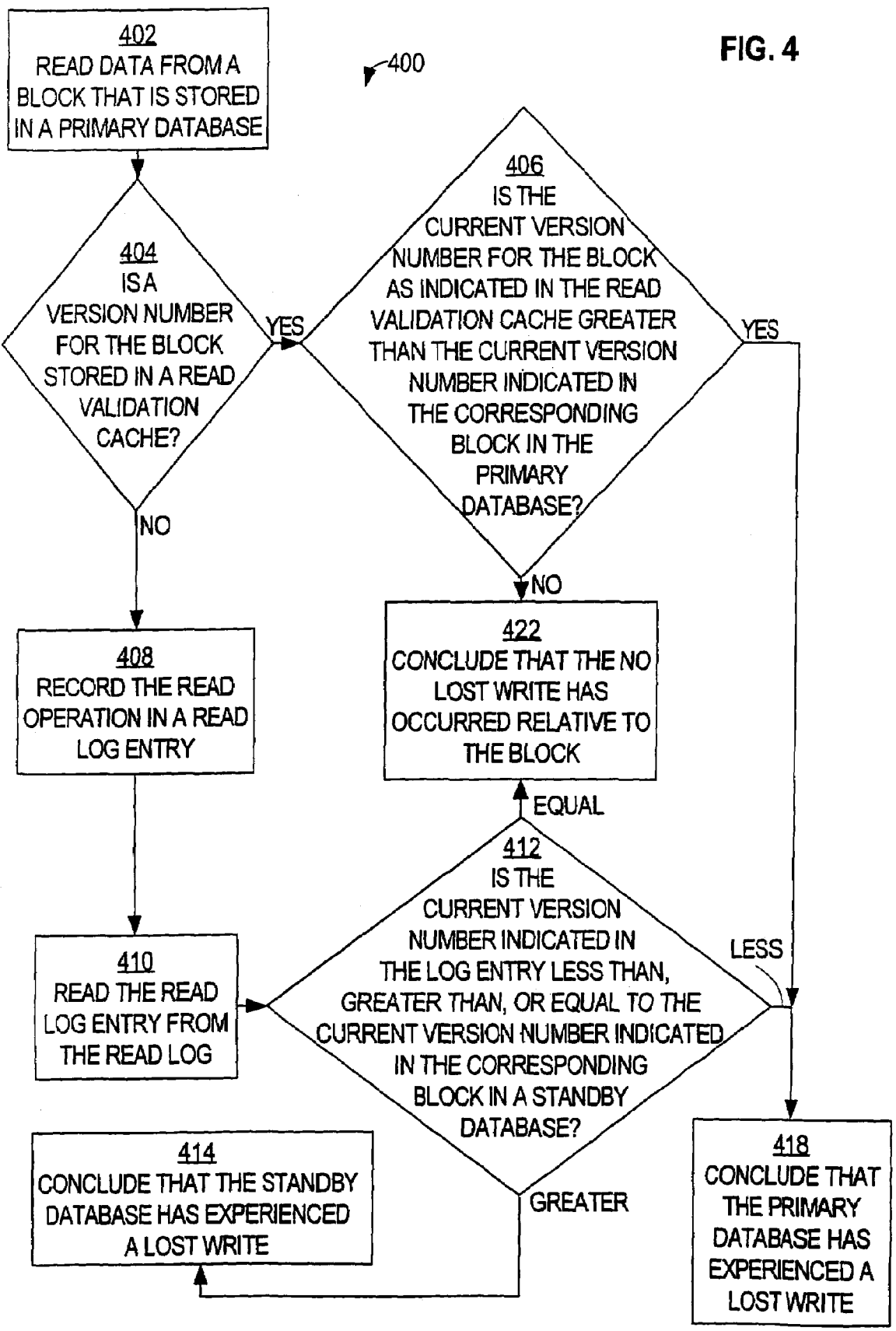
FIG. 4 is a flow diagram that illustrates an example of an enhanced version of a "read logging" technique in which read operations are logged only if version information for the read blocks is not already contained a read validation cache.

FIG. 4 is a flow diagram that illustrates an example of an enhanced version of a "read logging" technique in which read operations are logged only if version information for the read blocks is not already contained a read validation cache, in accordance with certain embodiments of the invention. Examples described below make reference to system 100 illustrated in FIG. 1.

By way of preliminary explanation, according to one embodiment, whenever a write operation is actually completed relative to a block in primary database 102 (as may be verified using the technique described above in relation to FIG. 2), the block's unique identifier and the block's post-increment current version number are stored in the read validation cache. The read validation cache may be maintained in the volatile memory (e.g., RAM) of a database server through which applications access primary database 102, for example. The read validation cache may be of a specified size. A replacement policy, such as a "least recently used" (LRU) policy, may be implemented to replace some information in the cache with other information when the cache becomes full.

In step 402, data is read from a block that is stored in a primary database. For example, an application may read, from primary database 102, data from block "24601".

In step 404, it is determined whether a version number for the block is stored in an in-memory read validation cache. For example, primary database 102 may determine whether an entry for block "24601" is contained in the read validation cache. If the block's version number is contained in the read validation cache, then control passes to step 406. Otherwise, control passes to step 408.

In step 406, it is determined whether the current version number for the block as indicated in the read validation cache is greater than the current version number indicated in the corresponding block in the primary database. For example, primary database 102 may compare the current version number for block "24601" as indicated in the read validation cache with the current version number indicated in block "24601" within primary database 102. If the cache's number is greater than the primary database block's number, then control passes to step 418. Otherwise, control passes to block 422.

Alternatively, in step 408, the read operation is recorded in a "read log" entry. For example, primary database 102 may append a log entry to the read log as described above in relation to the example accompanying FIG. 3. Control passes to step 410.

In step 410, the read log entry is read from the read log. For example, standby database 106 may read the next unread log entry from the read log. Control passes to step 412.

In step 412, it is determined whether the current version number indicated in the log entry is less than, equal to, or greater than the current version number indicated in the corresponding block in a standby database. For example, standby database 106 may compare the current version number indicated in the log entry for block "24601" with the current version number indicated in block "24601" within standby database 106. If the log entry's number is greater than the standby database block's number, then control passes to step 414. If the log entry's number is less than the standby database block's number, then control passes to step 418. If the log entry's number is equal to the standby database block's number, then control passes to step 422.

In step 414, the conclusion is reached that the standby database has experienced a lost write. In response, the standby database may take measures to repair the affected block on the standby database and/or to quarantine the affected block on the standby database. For example, standby database 106 may flag block "24601" in standby database 106 as being invalid or unreliable, and/or perform a "rollback" operation to reverse the previous write operation that caused erroneous data to be written to block "24601" in the first place. In one embodiment, the version of block "24601" stored in primary database 102 may be used to overwrite the version of block "24601" stored in standby database 106.

Alternatively, in step 418, the conclusion is reached that the primary database has experienced a lost write. The primary database may be notified about the lost write and the identity of the affected block. In response, the primary database may take measures to repair the affected block on the primary database and/or to quarantine the affected block on the primary database In one embodiment, the version of block "24601" stored in standby database 106 may be used to overwrite the version of block "24601" stored in primary database 102. The block can also be repaired by reading a block from a backup and then applying the changes described in the logs to bring it up to date. In another embodiment, the system performs a switchover such that standby database 106 becomes the primary database until (former) primary database 102 has been repaired.

Alternatively, in step 422, the conclusion is reached that no lost write has occurred relative to the block. No apparent repairs need to be made to either primary database 102 or standby database 106.

When the above technique is used, the read log can be viewed as an extension of the read validation cache, which typically is limited in size. The read validation cache also can be used in systems that lack a standby database. In such systems, no read logging would be performed as described above, even in the event that a block's version information cannot be found in the read validation cache.

Read Validation Caches in Real Application Clusters

In a "real application cluster," multiple database servers on separate computers ("nodes") all can concurrently access the same database. Each node has its own separate memory (i.e., RAM). For further information, the reader is directed to *Oracle Real Application Clusters Administrator's Guide*, 10g Release 1 (10.1), which is hereby incorporated by referenced in its entirety for all purposes as though fully disclosed herein.

As is discussed above, a read validation cache is stored in memory. Consequently, each node has its own separate read validation cache. This can complicate matters somewhat. If, for example, a first node writes to block "24601" in primary database 102, then the first node updates the block's current version number in primary database 102 (e.g., from "5" to "6") and stores the current version number (e.g., "6") in the first node's read validation cache. Later, if a second node writes to block "24601" in primary database 102, then the second node updates the block's current version number in primary database 102 (e.g., from "6" to "7") and stores the current version number (e.g., "7") in the second node's read validation cache. At that time, the current version number for block "24601" in the first node's read validation cache (e.g., "6") becomes outdated.

However, if the first node then reads block "24601" from primary database 102 and compares the block's current version number (e.g., "7") with the version number in the first node's read validation cache (e.g., "6"), the first node will still determine that the version number in the first node's read validation cache is not greater than the block's version number (see step 406 of FIG. 4 above). Therefore, there is no risk that the first node will incorrectly conclude that primary database 102 has experienced a lost write. Each node in a real application cluster understands that the current version number in its own validation cache might be less than the current version number in the corresponding block in primary database 102 due to some other node updating the block more recently. Once effect of this is that the nodes can still independently perform some partial checks for lost writes.

Even so, in one embodiment, in an effort to maintain the precision of read validation caches, whenever a first node sends a message to a second node in a real application cluster, the first node "piggybacks" block version update information onto the message. The block version update information indicates all of the block identifiers of the blocks that the first node has updated since the first node last sent a message to the second node. For each such block, the block version update information also indicates the current version numbers of those blocks as indicated in the first node's read validation cache.

Upon receiving the message onto which block version update information has been "piggybacked" as described above, the second node determines whether any of the current version numbers in the second node's read validation cache are outdated in comparison to the corresponding version numbers in the block version update information (a block's version number in a read validation cache may be considered outdated if it is less than the corresponding block's version number as indicated in the block version update information). For each current version number in the second node's read validation cache that is so outdated, the second node updates the version number in the second node's read validation cache to reflect the version number for the corresponding block as indicated in the block version update information.

In this way, read validation caches of multiple nodes in a real application cluster may be synchronized in an opportunistic manner, without causing any additional messages to be transmitted between the nodes. Nodes do not need to check the read validation caches of other nodes when comparing version numbers.

Maintaining the Read Validation Cache in Non-Volatile Memory

If a database server has access to non-volatile memory (e.g., NVRAM, battery-backed-up memory, bubble memory, flash memory, etc.) whose contents persist even through a node failure, then the read validation cache may be maintained in the non-volatile memory, and lost writes occurring relative to a primary database may be detected exclusively of any standby database or read logging mechanism. Because a read validation cache's size is necessarily finite, when a read validation cache is used exclusively of a standby database, according to one embodiment, only version information for blocks whose validity is uncertain is maintained in the read validation cache; if it can be determined with certainty that no lost write has occurred relative to a particular block, then the version information for that particular block would be removed from the read validation cache to avoid wasting memory.

As is discussed above in connection with FIG. 4, according to one embodiment, whenever a write operation is actually completed relative to a block in primary database 102, the block's unique identifier and the block's post-increment current version number are stored in the read validation cache. When the block is next read from primary database 102, the block's current version number is compared to the corresponding version number located in the read validation cache (see step 406 of FIG. 4 above), assuming that the corresponding version number can be found in the read validation cache. If the version numbers match, then it is certain that no lost write has occurred relative to the block; to make room for version numbers of other blocks in the cache, the version number for the block is removed from the cache. If the corresponding version number cannot be found in the read validation cache, then, instead of logging the read operation (as in step 408 of FIG. 4 above) it is assumed that no lost write has occurred relative to the block, since the corresponding version number would have been in the read validation cache if there was any doubt as to whether the block had experienced a lost write.

This assumption can be made because the version number for any block on which a write operation has occurred is maintained in the read validation cache until either (a) it is determined, in response to a read operation being performed relative to the block, that the block has not experienced a lost write, as described above, or (b) the version number is expelled from the read validation cache according to a replacement scheme.

The assumption can be made for version numbers so expelled because, according to one embodiment, before any version number for a block is so expelled, that block is read from the database, and, as is done whenever a block is read, a determination is made as to whether the block's current version number matches the corresponding version number in the read validation cache. If the version numbers match, then it is certain that no lost write has occurred relative to the block, and the version number in the read validation cache can be expelled safely.

As in any comparison between a block's current version number and the corresponding version number in the read validation cache, if the version numbers do not match, then a lost write has occurred, and remedial measures can be taken, relative to the block, as described above (e.g., flagging the block as containing unreliable data).

According to one embodiment, the read validation cache is accessed using different access mechanisms than those used to access the I/O subsystem. This helps to ensure that any problems which might inhere in the I/O subsystem, which caused any lost writes in the first place, do not also compromise the integrity of the information in the read validation cache.

In an alternative embodiment, the read validation cache is maintained in volatile memory. The danger of maintaining a read validation cache in volatile memory is that all of the contents of the cache will be lost if and when the node on which the cache resides fails. The consequence of losing the cache contents is that if any lost writes occurred relative to the blocks whose version numbers were in the cache, then those lost writes might never be detected. If this risk is acceptable, as in circumstances where node failure is predicted to be extremely rare, then the read validation cache may be maintained in volatile memory, such as standard RAM.

Maintaining the Read Validation Cache on Disk

In one embodiment, instead of or in addition to maintaining a read validation cache in memory as described above, a read validation cache is maintained on persistent storage other than memory, such as a hard disk drive. The read validation cache may be checked in response to read operations and updated in response to write operations in the same manner as described above, but because the persistent storage typically has a much larger capacity than non-volatile memory of the type discussed above, it is possible that the read validation cache might be able to store version numbers, concurrently, for every block in the database.

Compact Representation of Version Numbers

The discussion above refers in various places to version numbers. However, it is not actually necessary to store or compare full version numbers. In one embodiment, instead of storing and comparing full version numbers, only one or more bits of a full version number, such as one or more of the least significant bits of the version number, are stored in the logs and/or caches discussed above. In one embodiment, only the least significant bit of a version number is stored and compared; this is adequate except in the rare case that two or more lost writes occur without intermediate detection relative to the same block.

Hardware Example

Figure 5:
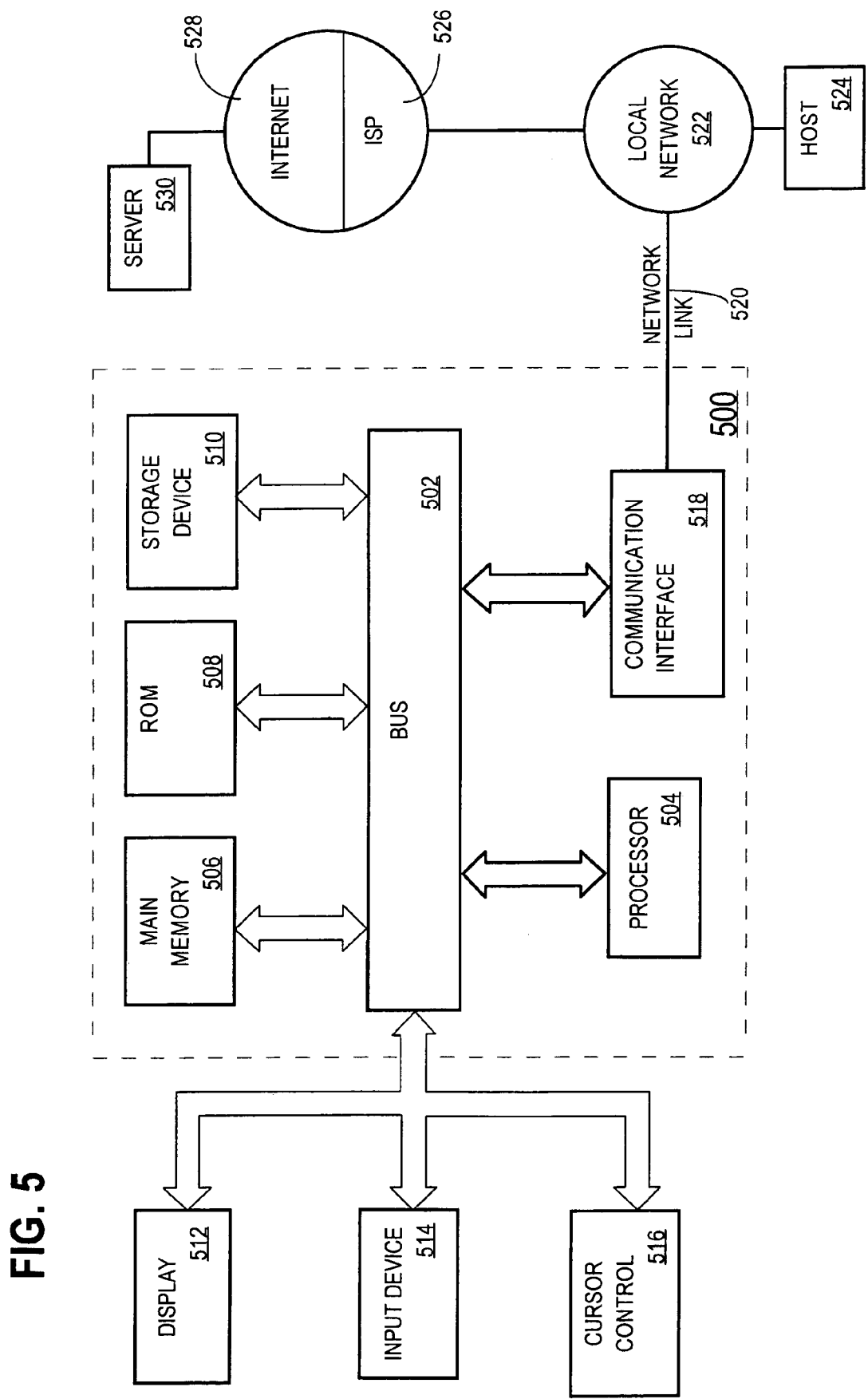
FIG. 5 is a block diagram of a computer system with which an embodiment may be carried out.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing a data integrity verification mechanism. According to one embodiment of the invention, a data integrity verification mechanism is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, nonvolatile media, volatile media, and transmission media. Nonvolatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for data integrity verification as described herein.

The received code may be executed by processor 504 as it is received, and/or stored in storage device 510, or other nonvolatile storage for later execution. In this manner, computer system 500 may obtain application code in the form of a carrier wave.

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method comprising the computer-implemented steps of:
    reading, from a read log that is updated when data units are read, a first version indicator that indicates a current version of a first instance of a data unit, wherein the first version indicator was written into the read log in response to the first instance of the data unit being read;
    reading a second version indicator that indicates the version of a second instance of the data unit;
    determining that the first version indicator does not indicate the same version of the data unit as the second version indicator; and
    in response to determining that the first version indicator does not indicate the same version as the second version indicator, then performing one or more specified actions relative to at least one of the first instance of the data unit and the second instance of the data unit,
    wherein the step of performing the one or more specified actions relative to at least one of the first instance of the data unit and the second instance of the data unit comprises flagging at least one of the first instance of the data unit and the second instance of the data unit as containing unreliable data, and
    wherein the steps of reading, determining, and performing are performed by a computing device.

2. The method as recited in claim 1, wherein the step of performing the one or more specified actions relative to at least one of the first instance of the data unit and the second instance of the data unit comprises overwriting the first instance of the data unit with the second instance of the data unit.

3. A volatile or non-volatile computer-readable storage medium carrying one or more sequences of instructions that, when executed by one or more processors, causes the one or more processors to perform the method recited in claim 2.

4. The method as recited in claim 1, further comprising:
    performing a switchover in response to determining that a primary database has experienced a lost write, wherein the switchover causes a standby database to assume the role of the primary database while the primary database is being repaired.

5. A volatile or non-volatile computer-readable storage medium carrying one or more sequences of instructions that, when executed by one or more processors, causes the one or more processors to perform the method recited in claim 4.

6. A volatile or non-volatile computer-readable storage medium carrying one or more sequences of instructions that, when executed by one or more processors, causes the one or more processors to perform the method recited in claim 1.

7. The method of claim 1, further comprising:
    maintaining, in volatile memory, a read validation cache that contains version numbers for a set of updated blocks that contains blocks that were updated more recently than any other updated blocks;
    in response to a read operation pertaining to a particular block, determining whether the read validation cache contains a version number for the particular block; and
    logging, in non-volatile storage, the read operation pertaining to the particular block only if the read validation cache does not contain the version number for the particular block.

8. A volatile or non-volatile computer-readable storage medium carrying one or more sequences of instructions that, when executed by one or more processors, causes the one or more processors to perform the method recited in claim 7.

9. A computer-implemented method comprising:
    reading, from a redo log to which changes made to blocks in a primary database are recorded, a log entry that indicates a change to a first block in the primary database;
    wherein the log entry includes data representing (a) a current version number of the first block, (b) a previous version number of the first block, and (c) an identifier of the first block;
    determining whether the previous version number indicated in the log entry is less than, equal to, or greater than a particular version number indicated in a second block that is (a) in a standby database for the primary database and (b) indicates an identifier that matches the identifier in the log entry;
    if the previous version number indicated in the log entry is greater than the particular version number, then overwriting the second block in the standby database with data from the first block in the primary database;
    if the previous version number indicated in the log entry is less than the particular version number, then overwriting the first block in the primary database with data from the second block in the standby database; and
    if the previous version number indicated in the log entry is equal to the particular version number, then maintaining the first block and the second block in the present states of the first block and the second block;
    wherein the standby database serves as a replica of the primary database;
    wherein, in an event that the primary database becomes inaccessible, the standby database is substituted for the primary database to allow access of data replicated in the standby database to continue even though the primary database is inaccessible, and where in the steps of reading, determining, overwriting, and maintaining are performed by a computing device.

10. A volatile or non-volatile computer-readable storage medium carrying one or more sequences of instructions that, when executed by one or more processors, causes the one or more processors to perform the method recited in claim 9.

11. A method comprising the computer-implemented steps of:
reading, from a read log that is updated when data units are read, a first version indicator that indicates a current version of a first instance of a data unit, wherein the first version indicator was written into the read log in response to the first instance of the data unit being read;
reading a second version indicator that indicates the version of a second instance of the data unit;
determining that the first version indicator does not indicate the same version of the data unit as the second version indicator; and
in response to determining that the first version indicator does not indicate the same version as the second version indicator, then (a) indicating that a write operation made by an I/O device in an I/O subsystem has not been completed, even though the I/O subsystem reports the write operation has been completed, and (b) performing one or more specified actions relative to at least one of the first instance of the data unit and the second instance of the data unit,
wherein the steps of reading, determining, and performing are performed by a computing device.

12. The method as recited in claim 11, wherein the step of performing the one or more specified actions relative to at least one of the first instance of the data unit and the second instance of the data unit comprises overwriting the first instance of the data unit with the second instance of the data unit.

13. A volatile or non-volatile computer-readable storage medium carrying one or more sequences of instructions that, when executed by one or more processors, causes the one or more processors to perform the method recited in claim 12.

14. The method as recited in claim 11, further comprising:
performing a switchover in response to determining that a primary database has experienced a lost write, wherein the switchover causes a standby database to assume the role of the primary database while the primary database is being repaired.

15. A volatile or non-volatile computer-readable storage medium carrying one or more sequences of instructions that, when executed by one or more processors, causes the one or more processors to perform the method recited in claim 14.

16. A volatile or non-volatile computer-readable storage medium carrying one or more sequences of instructions that, when executed by one or more processors, causes the one or more processors to perform the method recited in claim 11.

* * * * *

UNITED STATES PATENT AND TRADEMARK OFFICE
CERTIFICATE OF CORRECTION

PATENT NO. : 7,627,614 B2  Page 1 of 1
APPLICATION NO. : 11/072111
DATED : December 1, 2009
INVENTOR(S) : Wei Ming Hu et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 438 days.

On page 2, in column 2, under "Other Publications", line 23, delete "1574/K0LNP/04," and insert -- 1574/KOLNP/04, --, therefor.

In column 3, line 55, delete "10 g" and insert -- 10g --, therefor.

In column 8, line 19, delete "database" and insert -- database. --, therefor.

In column 15, line 1, in claim 9, delete "where in" and insert -- wherein --, therefor.

Signed and Sealed this

Fourteenth Day of September, 2010

David J. Kappos
*Director of the United States Patent and Trademark Office*